(12) United States Patent
Taylor et al.

(10) Patent No.: US 10,502,136 B2
(45) Date of Patent: Dec. 10, 2019

(54) FILTRATION SYSTEM FOR USE IN A GAS TURBINE ENGINE ASSEMBLY AND METHOD OF ASSEMBLING THEREOF

(71) Applicants: Robert Warren Taylor, Ponte Vedra Beach, FL (US); Stephen David Hiner, Salisbury (GB); Paul Sherwood Bryant, Hampshire (GB)

(72) Inventors: Robert Warren Taylor, Ponte Vedra Beach, FL (US); Stephen David Hiner, Salisbury (GB); Paul Sherwood Bryant, Hampshire (GB)

(73) Assignee: BHA Altair, LLC, Cleveland, OH (US)

( * ) Notice: Subject to any disclaimer, the term of this patent is extended or adjusted under 35 U.S.C. 154(b) by 654 days.

(21) Appl. No.: 14/507,616

(22) Filed: Oct. 6, 2014

(65) Prior Publication Data
US 2016/0097324 A1    Apr. 7, 2016

(51) Int. Cl.
*F02C 7/052* (2006.01)
*B01D 53/04* (2006.01)
*B01D 53/06* (2006.01)

(52) U.S. Cl.
CPC .......... *F02C 7/052* (2013.01); *B01D 53/0407* (2013.01); *B01D 53/06* (2013.01); *B01D 2251/404* (2013.01); *B01D 2253/102* (2013.01); *B01D 2257/80* (2013.01); *B01D 2258/06* (2013.01); *F05D 2250/191* (2013.01); *F05D 2260/607* (2013.01); *Y02E 20/14* (2013.01)

(58) Field of Classification Search
CPC ........ F02C 7/05; F02C 7/052; B01D 53/0407; B01D 53/06; B01D 2251/404; B01D 2253/102; B01D 2257/80; B01D 2258/06; F05D 2250/191; F05D 2260/607; Y02E 20/14
USPC .................... 60/39.092; 95/275; 96/123, 150
See application file for complete search history.

(56) References Cited

U.S. PATENT DOCUMENTS

| 3,168,999 A | 2/1965 | Warren et al. |
| 3,483,750 A | 12/1969 | Pratt |
| 3,612,598 A | 10/1971 | Keslin et al. |
| 3,715,911 A * | 2/1973 | Chuan ...................... G01N 5/00 324/71.4 |
| 3,884,036 A | 5/1975 | Pfenninger |

(Continued)

FOREIGN PATENT DOCUMENTS

| DE | 4209962 C1 | 9/1993 |
| EP | 0024809 A1 | 3/1981 |

(Continued)

*Primary Examiner* — Phutthiwat Wongwian
*Assistant Examiner* — Loren C Edwards
(74) *Attorney, Agent, or Firm* — Reinhart Boerner Van Deuren P.C.

(57) ABSTRACT

A filtration system and methods of assembly and operation are provided. The filtration system includes an array of perforated tubes in flow communication with a flow of intake air. Each perforated tube comprises a solids inlet and a solids outlet. The system also includes a solids feed system comprising a feed line coupled in flow communication with said solids inlet and configured to channel sorbent material through each perforated tube in said array. The filtration system also includes a monitoring arrangement for monitoring a parameter associated with the intake air, and varying the operation of the system based upon said parameter.

25 Claims, 2 Drawing Sheets

(56) References Cited

U.S. PATENT DOCUMENTS

| | | | |
|---|---|---|---|
| 3,910,716 A | 10/1975 | Roughgarden et al. | |
| 3,973,931 A | 8/1976 | Collins | |
| 3,996,335 A | 12/1976 | Wolk et al. | |
| 4,028,884 A | 6/1977 | Martz et al. | |
| 4,255,166 A * | 3/1981 | Gernand | B01D 46/32 |
| | | | 204/155 |
| 4,255,403 A | 3/1981 | Mayer et al. | |
| 4,674,275 A | 6/1987 | Stroem | |
| 4,806,136 A | 2/1989 | Kiersz et al. | |
| 4,926,620 A | 5/1990 | Donle | |
| 5,203,161 A | 4/1993 | Lehto | |
| 5,496,012 A | 3/1996 | Kenny, III | |
| 5,537,813 A | 7/1996 | Davis et al. | |
| 5,560,195 A | 10/1996 | Anderson et al. | |
| 5,697,207 A | 12/1997 | Cromer et al. | |
| 5,771,868 A | 6/1998 | Khair | |
| 5,824,273 A | 10/1998 | Tatani et al. | |
| 5,927,063 A | 7/1999 | Janda et al. | |
| 6,058,695 A | 5/2000 | Ranasinghe et al. | |
| 6,079,211 A | 6/2000 | Woollenweber et al. | |
| 6,250,064 B1 | 6/2001 | Tomlinson et al. | |
| 6,308,512 B1 | 10/2001 | Kopko | |
| 6,318,089 B1 | 11/2001 | Hiraga et al. | |
| 6,530,224 B1 | 3/2003 | Conchieri | |
| 6,634,165 B2 | 10/2003 | Tomlinson et al. | |
| 6,696,774 B1 | 2/2004 | Schneider et al. | |
| 6,718,771 B1 | 4/2004 | Kopko | |
| 6,769,258 B2 | 8/2004 | Pierson | |
| 6,880,343 B2 | 4/2005 | Kopko | |
| 6,901,348 B2 | 5/2005 | Smith et al. | |
| 6,938,405 B2 | 9/2005 | Carberg et al. | |
| 6,952,639 B2 | 10/2005 | Kumar et al. | |
| 6,959,552 B2 | 11/2005 | Leblanc | |
| 7,115,237 B2 * | 10/2006 | Sato | B01D 53/944 |
| | | | 423/213.2 |
| 7,150,778 B1 | 12/2006 | Dauber et al. | |
| 7,185,498 B1 | 3/2007 | Johnson | |
| 7,343,746 B2 | 3/2008 | Pierson | |
| 7,527,674 B1 | 5/2009 | Janawitz et al. | |
| 7,585,343 B2 | 9/2009 | Clements | |
| 7,634,385 B2 | 12/2009 | Smith | |
| 7,644,573 B2 | 1/2010 | Smith et al. | |
| 7,648,564 B2 | 1/2010 | Chillar et al. | |
| 7,695,551 B2 | 4/2010 | Janawitz et al. | |
| 7,707,814 B2 | 5/2010 | Sonoda et al. | |
| 8,001,787 B2 | 8/2011 | Sutcu et al. | |
| 8,038,776 B2 | 10/2011 | Janawitz et al. | |
| 8,114,196 B2 | 2/2012 | Lamee | |
| 8,262,780 B2 | 9/2012 | Smithies et al. | |
| 8,263,214 B2 | 9/2012 | Kalayci et al. | |
| 8,337,597 B2 | 12/2012 | Chillar et al. | |
| 8,372,181 B2 | 2/2013 | Davies | |
| RE44,079 E | 3/2013 | Pierson | |
| 8,440,002 B2 | 5/2013 | Jarrier et al. | |
| 8,475,115 B2 | 7/2013 | Zhang et al. | |
| 8,673,040 B2 * | 3/2014 | Handley | B01D 46/0068 |
| | | | 55/302 |
| 2002/0056994 A1 | 5/2002 | Irish | |
| 2002/0083712 A1 | 7/2002 | Tomlinson et al. | |
| 2002/0152891 A1 | 10/2002 | Massimo et al. | |
| 2003/0106319 A1 | 6/2003 | Kopko | |
| 2004/0031450 A1 | 2/2004 | Chandran et al. | |
| 2004/0093147 A1 | 5/2004 | Kumar et al. | |
| 2004/0011046 A1 | 6/2004 | Pierson | |
| 2004/0105801 A1 | 6/2004 | Sato et al. | |
| 2004/0243350 A1 | 12/2004 | Smith et al. | |
| 2005/0056023 A1 | 3/2005 | Pierson | |
| 2005/0102995 A1 | 5/2005 | Carberg et al. | |
| 2005/0182576 A1 | 8/2005 | Smith | |
| 2005/0204743 A1 | 9/2005 | Leblanc | |
| 2006/0179918 A1 | 8/2006 | Liu | |
| 2007/0039331 A1 | 2/2007 | Jonsson | |
| 2007/0051109 A1 | 3/2007 | Sonoda et al. | |
| 2007/0240400 A1 | 10/2007 | Smith et al. | |
| 2007/0294984 A1 | 12/2007 | Chillar et al. | |
| 2008/0022856 A1 | 1/2008 | Clements | |
| 2008/0202124 A1 | 8/2008 | Sutcu et al. | |
| 2009/0071114 A1 | 3/2009 | Smithies et al. | |
| 2009/0150040 A1 | 6/2009 | Rofka et al. | |
| 2009/0229468 A1 | 9/2009 | Janawitz et al. | |
| 2009/0252598 A1 | 10/2009 | Snider et al. | |
| 2009/0320678 A1 | 12/2009 | Chang et al. | |
| 2010/0050873 A1 | 3/2010 | Hiner et al. | |
| 2010/0054926 A1 | 3/2010 | Zhang et al. | |
| 2010/0175389 A1 | 7/2010 | Janawitz et al. | |
| 2010/0205967 A1 | 8/2010 | Gopalkrishna et al. | |
| 2010/0300975 A1 | 12/2010 | Pate | |
| 2010/0319384 A1 | 12/2010 | Zhang et al. | |
| 2011/0016838 A1 | 1/2011 | Smithies et al. | |
| 2011/0048228 A1 | 3/2011 | Handley et al. | |
| 2011/0048236 A1 | 3/2011 | Lamee | |
| 2011/0052377 A1 | 3/2011 | Chamoto et al. | |
| 2011/0132032 A1 | 6/2011 | Gatti et al. | |
| 2011/0173947 A1 | 7/2011 | Zhang et al. | |
| 2011/0192171 A1 | 8/2011 | Sutcu et al. | |
| 2011/0198055 A1 | 8/2011 | Meirav et al. | |
| 2011/0206573 A1 | 8/2011 | Ackley et al. | |
| 2011/0289898 A1 | 12/2011 | Hellat et al. | |
| 2011/0289899 A1 | 12/2011 | De La Cruz Garcia et al. | |
| 2011/0290116 A1 | 12/2011 | Jarrier et al. | |
| 2011/0299973 A1 * | 12/2011 | Zhang | B01D 46/0023 |
| | | | 415/121.2 |
| 2012/0005997 A1 | 1/2012 | Davies | |
| 2012/0199001 A1 | 8/2012 | Chillar et al. | |
| 2012/0247114 A1 | 10/2012 | Pierson et al. | |
| 2012/0269613 A1 | 10/2012 | Mills et al. | |
| 2013/0000321 A1 | 1/2013 | Arar et al. | |
| 2013/0011244 A1 | 1/2013 | Hao et al. | |
| 2013/0051994 A1 | 2/2013 | Lafontaine et al. | |
| 2013/0067922 A1 | 3/2013 | Zhang et al. | |
| 2013/0087219 A1 | 4/2013 | Rajesh et al. | |
| 2013/0092642 A1 | 4/2013 | Ray et al. | |
| 2013/0168180 A1 | 7/2013 | Merchant et al. | |
| 2013/0199202 A1 | 8/2013 | Zhang et al. | |
| 2013/0298774 A1 | 11/2013 | Ding et al. | |
| 2014/0123853 A1 | 5/2014 | Desai et al. | |
| 2014/0137780 A1 | 5/2014 | Boulet | |
| 2015/0078964 A1 | 3/2015 | Meirav et al. | |

FOREIGN PATENT DOCUMENTS

| | | |
|---|---|---|
| EP | 0 350 272 A1 | 1/1990 |
| EP | 0 605 159 A1 | 7/1994 |
| EP | 0 651 145 B1 | 5/1995 |
| EP | 0 648 919 B1 | 12/1998 |
| EP | 0 952 316 B1 | 10/1999 |
| EP | 1 005 605 B1 | 6/2000 |
| EP | 1 225 306 B1 | 7/2002 |
| EP | 1 245 805 A2 | 10/2002 |
| EP | 1 407 119 B1 | 1/2005 |
| EP | 1 744 014 A1 | 1/2007 |
| EP | 1 760 292 A2 | 3/2007 |
| EP | 1 762 715 A2 | 3/2007 |
| EP | 1 882 510 A1 | 1/2008 |
| EP | 2 126 289 | 9/2008 |
| EP | 2 198 945 A2 | 6/2010 |
| EP | 2 368 022 | 7/2010 |
| EP | 2 248 999 A1 | 11/2010 |
| EP | 2 369 145 A1 | 9/2011 |
| EP | 2 392 394 A1 | 12/2011 |
| EP | 2 514 927 A2 | 10/2012 |
| EP | 2 541 022 A2 | 1/2013 |
| EP | 2 570 631 A2 | 3/2013 |
| EP | 2 573 365 A2 | 3/2013 |
| EP | 2 613 036 A2 | 7/2013 |
| EP | 2 626 535 A2 | 8/2013 |
| EP | 1 733 127 B1 | 4/2014 |
| JP | 56-28634 | 3/1981 |
| JP | 2004-108320 | 4/2004 |
| WO | WO 1990/000436 A1 | 1/1990 |
| WO | WO 1996/036799 A1 | 11/1996 |
| WO | WO 1999/009301 A1 | 2/1999 |
| WO | WO 1999/009309 A1 | 2/1999 |
| WO | WO 2001/018372 A1 | 3/2001 |

(56) References Cited

FOREIGN PATENT DOCUMENTS

| | | |
|---|---|---|
| WO | WO 2003/002851 A1 | 1/2003 |
| WO | WO 2003/089770 A1 | 10/2003 |
| WO | WO 2004/044386 A2 | 5/2004 |
| WO | WO 2005/088104 A1 | 9/2005 |
| WO | WO 2006/101767 A2 | 9/2006 |
| WO | WO 2008/105862 A1 | 9/2008 |
| WO | WO 2010/072710 A2 | 7/2010 |
| WO | WO 2011/110554 A1 | 9/2011 |
| WO | WO 2012/012912 A1 | 2/2012 |
| WO | WO 2013/155159 A1 | 10/2013 |

\* cited by examiner

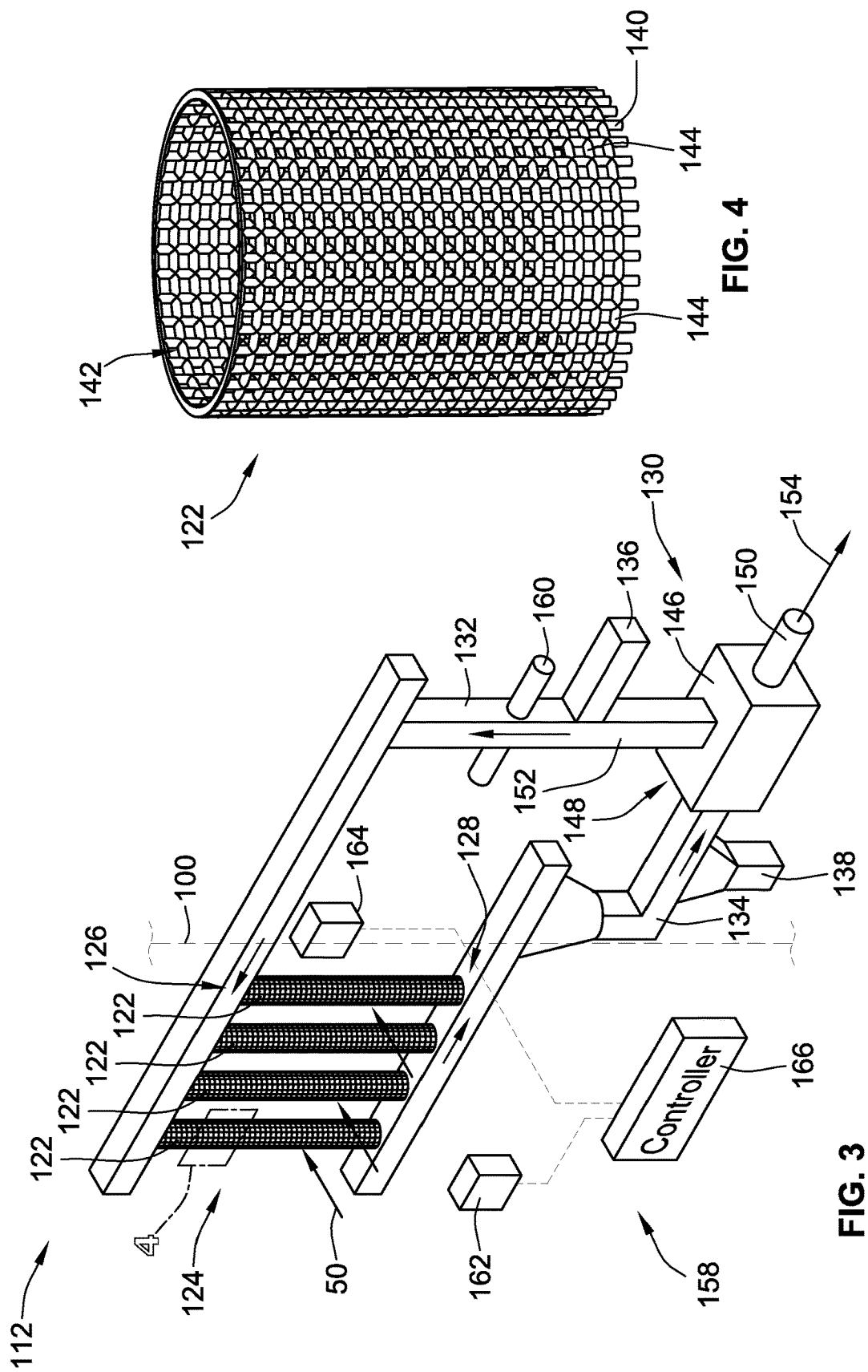

FILTRATION SYSTEM FOR USE IN A GAS TURBINE ENGINE ASSEMBLY AND METHOD OF ASSEMBLING THEREOF

FIELD OF THE INVENTION

This invention generally relates to gas turbine engines and, more specifically, to a sorbent regeneration and recirculation system for use in filtration systems of a gas turbine engine.

BACKGROUND OF THE INVENTION

Rotary machines, such as gas turbines, are often used to generate power for electric generators. Gas turbines, for example, have a working fluid path which typically includes, in serial-flow relationship, an air intake, a compressor, a combustor, a turbine, and a gas outlet. Compressor and turbine sections include at least one row of circumferentially-spaced rotating buckets or blades positioned within a housing. At least some known gas turbine engines are used in cogeneration facilities and power plants.

Generally, gas turbines use intake air during normal operation for combustion purposes. Intake air is drawn through a filter house and towards the compressor, wherein the compressor-discharge air is mixed with fuel and ignited in the combustor. Because intake air generally contains various solid and gaseous contaminants, at least some filter houses include filtration systems that facilitate removing contaminants entrained in the intake air. Such known filtration systems generally include an array of filter elements formed from porous filter media positioned upstream from the compressor.

At least some known filter media have a sorbent material impregnated therein to facilitate removing the gaseous contaminants from the intake air. However, because sorbent material has a finite capacity, once saturated with contaminants, the sorbent material needs to be replaced to enable gaseous contaminants to continue to be removed from the intake air. Replacement of the sorbent material generally includes replacing the saturated filter media. As such, either the gas turbine engine needs to be shut down to replace the filter media, or a spike in contaminants ingested by the gas turbine engine will occur if the saturated filter media are replaced during operation of the gas turbine engine.

Accordingly, there is a need in the art for a more efficient system and method for the above filtration process. The invention provides such a system and method. These and other advantages of the invention, as well as additional inventive features, will be apparent from the description of the invention provided herein.

BRIEF SUMMARY OF THE INVENTION

In one aspect, a filtration system for use in a gas turbine engine assembly is provided. An embodiment of such a system according to this aspect includes an array of perforated tubes in flow combination with a flow of intake air. Each perforated tube comprises a solids inlet and a solids outlet. This system also includes a solids feed system comprising a feed line coupled in flow communication with said solids inlet and configured to channel sorbent material through each perforated tube in said array. The sorbent material is configured to remove gaseous contaminants entrained in the flow of intake air.

The solids feed system may also include a recycle line coupled in flow communication with said solids outlet and configured to receive spent sorbent material from said array of perforated tubes. The solids feed system may also include a heater coupled in flow communication with said recycle line. The heater is configured to regenerate the spent sorbent material. In certain embodiments, the heater comprises an outlet configured to channel a flow of contaminant-rich off-gas away from the flow of intake air as the spent sorbent material is regenerated.

In certain embodiments, the solids feed system is configured to channel sorbent material through said array of perforated tubes at a flow rate based at least partially on a regeneration rate of the spent sorbent material. The solids feed system may also be configured to channel sorbent material through said array of perforated tubes at a flow rate based at least partially on an adsorption capacity of the sorbent material. The solids feed system may also be configured to channel a substantially continuous flow of sorbent material through said array of perforated tubes. The solids feed system may be configured to channel sorbent material selected as a function of characteristics of the intake air.

In certain embodiments, the sorbent material may include at least one of a carbon-based material, a calcium-based material, and a desiccant material.

The system may also include a monitoring arrangement for monitoring a parameter of the intake air upstream and downstream from the array of perforated tubes. The monitoring arrangement may include a first monitor and a second monitor and a controller. The first and second monitors are operatively connected to the controller. The first monitor may be positioned upstream of the array of perforated tubes relative to the flow of intake air. The second monitor may be positioned downstream of the array of perforated tubes relative to the flow of intake air. In certain embodiments, at least one of the first and second monitors can comprise a Quartz Crystal Microbalance.

In another aspect, a gas turbine engine assembly is provided. An embodiment of such a gas turbine engine assembly includes a filter house. The filter house includes an array of perforated tubes in flow communication with a flow of intake air. Each perforated tube comprises a solids inlet and a solids outlet. The filter house also comprises a solids feed system comprising a feed line coupled in flow communication with the solids inlet and configured to channel sorbent material through each perforated tube in the array. The sorbent material is configured to remove gaseous contaminants and trained in the flow of intake air in a duct coupled to an outlet of said filter house. The duct is configured to channel the flow of intake air downstream therefrom. The filter house may also include a monitoring arrangement for monitoring a parameter of the intake air upstream and downstream from the array of perforated tubes. The monitoring arrangement is operable to ferry at least one of a recirculation, regeneration, and replacement frequency of said sorbent material based upon said monitored parameter.

The filter house may also include a filter assembly configured to remove solid contaminants and trained in the flow of intake air. The filter assembly may be downstream from the array of perforated tubes. The filter assembly in certain embodiments may comprise at least one high efficiency filter element measured in accordance with at least one of the EN1822 and EN779.

In certain embodiments, the solids feed system also includes a recycle line coupled in flow communication with the solids outlet and configured to receive spent sorbent material from the array of perforated tubes. The solids feed system may also include a heater coupled in flow communication with the recycle line. The heater is configured to regenerate spent sorbent material. In certain embodiments, the heater is positioned away from the filter house such that a flow of contaminant-rich off-gas is channeled away from the flow of intake air as the spent sorbent material is regenerated.

The solids feed system may be configured to channel sorbent material through the array of perforated tubes at a flow rate based at least partially on a regeneration rate of the spent sorbent material. The solids feed system may also be configured to channel sorbent material through the array of perforated tubes at a flow rate based at least partially on an adsorption capacity of the sorbent material.

In yet another aspect, a method of assembling a filtration system for use in a gas turbine assembly is provided. An embodiment of such a method includes providing an array of perforated tubes that each include a solids inlet and a solids outlet. The array of perforated tubes is configured to be in flow communication with a flow of intake air. The method also includes coupling a feed line of a solids feed system in flow communication with the solids inlet. The solids feed system is configured to channel sorbent material through each perforated tube in the array. The sorbent material is configured to remove gaseous contaminants and trained in the flow of intake air.

In certain embodiments, the method can also include positioning a filter assembly downstream from the array of perforated tubes. The filter assembly is configured to remove solids contaminants and trained in the flow of intake air. The method may also include coupling a recycle line coupled in flow communication with the solids outlet. The recycle line is configured to receive spent sorbent material from the array of perforated tubes. The method may also include coupling a heater in flow communication with the recycle line. The heater is configured to regenerate spent sorbent material. The method may also include orienting an outlet defined in the heater such that a flow of contaminate-rich off-gas is channeled therethrough and is discharged away from the flow of intake air as the spent sorbent material is regenerated.

In certain embodiments, the method may also include positioning a monitoring arrangement in proximity to the array of perforated tubes.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 is a schematic illustration of an exemplary filter assembly that may be used in the filtration system shown in FIG. 2; and FIG. 4 is an enlarged sectional view of an exemplary perforated tube shown in FIG. 3 and taken along Area 4.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The embodiments described herein relate to a filtration system for use in a gas turbine engine assembly. In the exemplary embodiment, the filtration system includes an array of perforated tubes in flow communication with a flow of intake air for the gas turbine engine assembly, and a solids feed system coupled in flow communication with the array. More specifically, the solids feed system channels sorbent material through each perforated tube such that gaseous contaminants entrained in the flow of intake are adsorbed by the sorbent material. As the sorbent material becomes saturated with the gaseous contaminants, the solids feed system channels unsaturated sorbent material towards the array and recycles the saturated sorbent material towards a sorbent regeneration assembly. The sorbent regeneration assembly is positioned away from the flow of intake air such that a gaseous contaminant-rich off-gas formed during the regeneration process does not reenter the flow of intake air. As such, the systems and methods described herein enable unsaturated sorbent material to be continuously or periodically channeled into the perforated tubes to facilitate replacing saturated sorbent material and to facilitate reducing down time of the gas turbine assembly.

Figure 1:
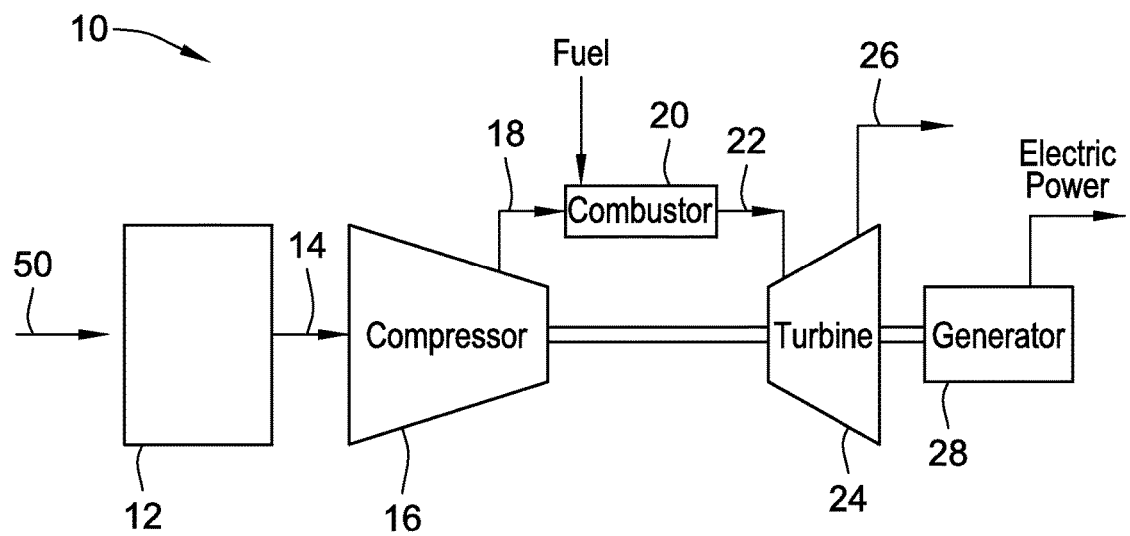
FIG. 1 is a schematic illustration of an exemplary gas turbine power system.

FIG. 1 is a schematic diagram of an exemplary gas turbine power system 10. In the exemplary embodiment, gas turbine power system 10 includes, in serial-flow relationship, a filtration system 12, a compressor 16, a combustor 20, and a turbine 24. Intake air 50 is filtered in filtration system 12 and filtered intake air 14 is directed to axial flow compressor 16. Intake air 50 is at ambient air temperature. Compressed air 18 is directed towards combustor 20 where fuel is injected with compressed air 18 for combustion purposes. Hot gas 22 is discharged from combustor 20 and is directed to turbine 24 where the thermal energy of hot gas 22 is converted to work. A portion of the work is used to drive compressor 16, and the balance is used to drive an electric generator 28 to generate electric power. A hot exhaust gas mixture 26 is discharged from turbine 24 and channeled to either the atmosphere or to a Heat Recovery Steam Generator (HRSG) (not shown).

Figure 2:
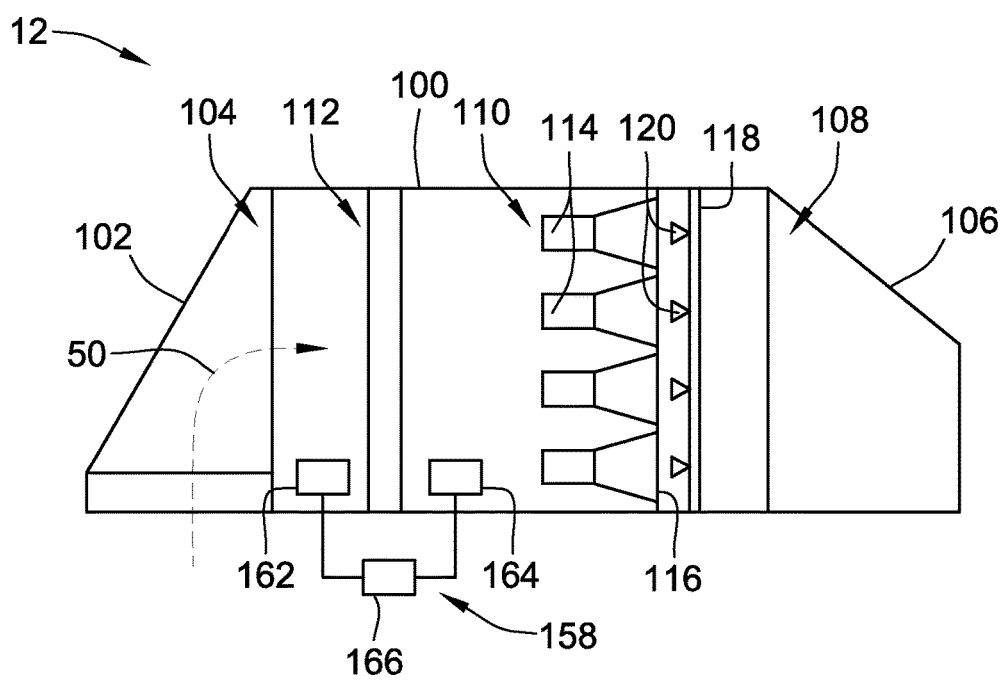
FIG. 2 a schematic illustration of an exemplary filtration system that may be used with the power system shown in FIG. 1.

FIG. 2 is a schematic illustration of an exemplary filtration system 12. In the exemplary embodiment, filtration system 12 includes a filter house 100, a weather hood 102 coupled to an inlet 104 of filter house 100, and a transition duct 106 coupled to an outlet 108 of filter house 100. Weather hood 102 facilitates blocking inclement weather such as rain, snow, and large airborne particles from entering filtration system 12. In one embodiment, weather hood 102 may include a plurality of coalescent pads (not shown) to prevent the ingestion of water droplets and/or snowflakes into filtration system 12. Further, in operation, transition duct 106 channels intake air 50 downstream from filter house 100 towards compressor 16 (shown in FIG. 1).

In the exemplary embodiment, filter house 100 includes a first filter assembly 110, and a second filter assembly 112 upstream from first filter assembly 110. First filter assembly 110 removes solid contaminants entrained in intake air 50, and second filter assembly 112 removes gaseous contaminants entrained in intake air 50. In some embodiments, second filter assembly 112 includes sorbent material that may erode and become entrained in intake air 50 during operation of filter house 100. As such, first filter assembly 110 is downstream from second filter assembly 112 to enable eroded sorbent material to be removed from intake air 50 before being channeled downstream therefrom. In an alternative embodiment, second filter assembly 112 may be positioned downstream from first filter assembly 110. Further, multiple filter assemblies 112 may also be utilized, which may utilize the same or different sorbent in each assembly.

First filter assembly 110 includes a plurality of filter elements 114 coupled to a tube sheet 116. First filter assembly 110 also includes a pulse cleaning system 118 that periodically directs a flow of cleaning air (not shown) towards filter elements 114 to remove collected particulates therefrom. More specifically, pulse cleaning system 118 includes a plurality of cleaning nozzles 120 that direct the cleaning air towards filter elements 114 to facilitate reducing a pressure drop across filter elements 114 caused by a build-up of solid contaminants thereon. In some embodiments, filter elements 114 are high-efficiency filters. As used herein, the term "high-efficiency filter" means a filter that may be measured in accordance with at least one of EN1822 (2009) and EN779 (2011). In other embodiments, the first filter assembly may encompass different filtrations methodologies than the canister pulse type described above, indeed it may be a barrier static filter type system.

FIG. 3 is a schematic illustration of second filter assembly 112 that may be used in the filtration system 12 (shown in FIG. 2), and FIG. 4 is an enlarged sectional view of a perforated tube 122 taken along Area 4. In the exemplary embodiment, second filter assembly 112 includes an array 124 of perforated tubes 122 in flow communication with a flow of intake air 50. Each perforated tube 122 includes a solids inlet 126 and a solids outlet 128. Second filter assembly 112 also includes a solids feed system 130 coupled in flow communication with array 124. More specifically, solids feed system 130 includes a feed line 132 coupled in flow communication with solids inlet 126, and a recycle line 134 coupled in flow communication with solids outlet 128. Solids feed system 130 also includes a sorbent inlet 136 and a sorbent outlet 138 defined therein. As will be described in more detail below, sorbent inlet 136 and sorbent outlet 138 are selectively used to facilitate introducing additional sorbent material (not shown) into solids feed system 130 and/or to facilitate replacing degraded sorbent material. Moreover, in some embodiments, solids feed system 130 channels sorbent material through perforated tubes 122 via a feed arrangement 160 such as, but not limited to, a pump. Sorbent inlet 136 may for example be connected to a sorbent material hopper (not shown) that is operable to automatically feed sorbent material into the system.

The sorbent material may be any material that facilitates removing gaseous contaminants from intake air 50. Exemplary sorbent material includes, but is not limited to, a carbon-based material, a calcium-based material, and a desiccant material.

In the exemplary embodiment FIG. 4, perforated tubes 122 include a side wall 140 defining an interior cavity 142 in each perforated tube 122, and a plurality of perforations 144 defined in side wall 140. Perforations 144 extend through side wall 140 such that sorbent material channeled through interior cavity 142 of perforated tubes 122 is in flow communication with intake air 50. Moreover, perforations 144 are sized to restrict sorbent material from being discharged therethrough. As such, the sorbent material substantially remains within perforated tubes 122 as solids feed system 130 channels the sorbent material therethrough.

Perforated tubes 122 may be fabricated from any material that enables second filter assembly 112 to function as described herein. Moreover, although shown as having a circular cross-sectional shape, perforated tubes 122 may have any cross-sectional shape that enables second filter assembly 112 to function as described herein. It is also possible to utilize a liquid sorbent with the use of lined tubes utilizing liners which hold the liquid within the tubes, but permit the filtered air passing over the tubes to adsorb into the liquid.

Solids feed system 130 also includes a heater 146 coupled in flow communication between feed line 132 and recycle line 134, and positioned away from filter house 100. More specifically, heater 146 includes an inlet 148 coupled in flow communication with recycle line 134, an off-gas outlet 150, and an outlet 152 coupled in flow communication with feed line 132. Heater 146 regenerates spent sorbent material by heating it to a temperature that facilitates releasing the gaseous contaminants therefrom. As used herein, "spent sorbent material" refers to sorbent material that has at least partially adsorbed gaseous contaminants entrained in intake air 50. Alternatively, the spent sorbent material may be regenerated using any system that enables second filter assembly 112 to function as described herein.

In operation, solids feed system 130 channels sorbent material through each perforated tube 122 in array 124. More specifically, substantially unsaturated sorbent material is channeled through feed line 132 and towards array 124 of perforated tubes 122. Perforations 144 in perforated tubes 122 allow the sorbent material to be in flow communication with intake air 50. As intake air 50 flows past array 124, the sorbent material in perforated tubes 122 facilitates removing gaseous contaminants entrained in intake air 50. More specifically, the sorbent material adsorbs the gaseous contaminants from intake air 50 to become spent sorbent material.

The spent sorbent material is then channeled from perforated tubes 122, through recycle line 134, and towards heater 146. As described above, sorbent material has a finite capacity for adsorbing gaseous contaminants from intake air 50. Heater 146 facilitates regenerating the spent sorbent material. As heater 146 increases the temperature of the spent sorbent material, gaseous contaminants are released from the sorbent material and a contaminant-rich off-gas 154 is discharged through off-gas outlet 150. Off-gas outlet 150 is oriented such that contaminant-rich off-gas 154 is discharged away from intake air 50.

Solids feed system 130 channels sorbent material through array 124 of perforated tubes 122 at a rate based on a variety of factors. For example, the flow rate of sorbent material is based at least partially on a regeneration rate of the sorbent material and the adsorption capacity of the sorbent material. The flow rate of sorbent material is then determined such that the sorbent material is replaced before becoming fully saturated with gaseous contaminants. Moreover, solids feeds system 130 may channel sorbent material through array 124 at either a substantially continuous flow rate, or periodically as the sorbent material becomes saturated.

In some embodiments, the type of sorbent material channeled through array 124 is selected based on characteristics of intake air 50. Exemplary characteristics include, but are not limited to, moisture content and composition of intake air 50. For example, the ratio of desiccant material channeled through array 124 may be increased as the relative humidity of the ambient environment surrounding filter house 100 and the moisture content of intake air 50 increases. In some embodiments, second filter assembly 112 is a closed loop system. As such, at a least a portion of the sorbent material already in solids feed system 130 is removed through sorbent outlet 138 before the new sorbent material is introduced into solids feed system 130 through sorbent inlet 136. As the characteristics of intake air 50 vary over time and/or as a function of a location of gas turbine power system 10 (shown in FIG. 1), the proportions of various sorbent material channeled through array 124 is selected to facilitate removing the various gaseous contaminants from intake air 50. Alternatively, new sorbent material may be introduced through sorbent inlet 136 to replace the sorbent material in solids feed system 130 as it degrades over time.

The systems and methods described herein relate to filtration of gaseous contaminants entrained in a flow of intake air. More specifically, sorbent material is channeled through an array of perforated tubes that allow gaseous contaminants entrained in the flow of intake air to be adsorbed by the sorbent material. As the sorbent material becomes saturated with gaseous contaminants, substantially unsaturated sorbent material is channeled through the perforated tubes to replace the spent sorbent material, and the spent sorbent material is channeled towards a regeneration system. The regeneration system regenerates the spent sorbent material such that the regenerated sorbent material can be recirculated towards the array to replace the sorbent material as it becomes saturated. As such, continuously regenerating and recirculating sorbent material through the systems described herein facilitate maintaining filtration efficiency while reducing down time of an associated gas turbine assembly.

Returning to FIG. 3, the system may also include a monitoring arrangement 158 for managing the rate recirculation of sorbent and other system functions. Monitoring arrangement 158 comprises a first and a second monitor 162, 164, each of which are operatively connected to and in communication with a controller 166. As can best be seen in FIG. 3, first monitor 162 is positioned upstream of sorbent array 124 relative to the flow of intake air 50. Second monitor 164 is positioned downstream of sorbent array 124 relative to the flow of intake air 50.

First and second monitors 162, 164 monitor in real time the air upstream and downstream from filter elements 114. In one embodiment, the monitors detect in real time the quantity of a target gas in the air, e.g. the gas intended to be removed by the sorbent material. Other parameters may also be monitored, including but not limited to the corrosiveness of the air. First and second monitors may take the form of a real time gas analyzer or a device that indicates corrosion rate, such as a Quartz Crystal Microbalance (QCM).

In one embodiment, first and second monitors 162, 164 provide to controller 166 the amount of target gas in the air at their respective locations in the flow path as an input. Those skilled in the art will recognize that the difference between the quantity of target gas detected by first monitor 162 and second monitor 164 is effectively a measurement of the overall effectiveness of the sorbent material. As discussed above, over time the sorbent material will lose its effectiveness and need to be recirculated and regenerated, and/or replaced in whole or in part with new sorbent material. In one embodiment, controller 166 calculates the difference between the readings taken at first and second monitors 162, 164. Controller 166 is also operable to compare this difference to a lookup table to determine if a recirculation/regeneration and/or replacement is necessary. A relatively larger difference indicates sorbent material effectiveness, while a relatively small difference is indicative of the need for a recirculation/regeneration and/or replacement cycle.

In one embodiment, controller 166 may compare the aforementioned difference to base line known difference data indicative of ideal performance characteristics for the difference between the quantity of target gas upstream of filters 114 and downstream of filters 114. As the difference between the base line difference and the actual difference between the readings taken by monitors 162, 164 decreases, the recirculation/regeneration and/or replacement frequency may be decreased. As the difference between the base line difference and the actual difference between the readings taken by monitors 162, 164 increases, the recirculation/regeneration and/or replacement frequency may be increased.

The aforementioned baseline difference to actual difference comparison provides an indication of the degradation of the sorbent material. The sorbent material will lose its effectiveness over time and over multiple regeneration cycles. As such, the aforementioned baseline difference to actual difference comparison allows for the controller 166 to determine if degraded sorbent material should be replaced with new sorbent material.

Further, controller 166 may also vary the recirculation/regeneration and/or replacement cycle frequency based upon an increase in target gas detected by first monitor 162. Such an increase will implicate a higher load upon the sorbent material, and thus necessitate more frequent recirculation/regeneration and/or replacement cycles. An increase in this frequency may be triggered by an isolated spike in target gas quantity detected at first monitor 162. Alternatively, controller 166 may be configured to modify recirculation/regeneration and/or replacement cycle frequency based upon a long term change in intake air characteristics detected at first monitor 162.

Further, controller 166 can also monitor the rate of change of the measured quantities at first and second monitors 162, 164. This allows the system to anticipate increases or decreases in recirculation/regeneration and/or replacement cycle frequency based upon these rates of change. Such a configuration avoids over-shooting or under-shooting the required performance characteristics of the system.

Controller 166 can include all of the necessary software, hardware, and firmware necessary to achieve the aforementioned functionality. Additionally, controller 166 may be directly connected to the other components of the system to achieve the control thereof, including feeding arrangement 160, heater 146, etc.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filtration system for use in a gas turbine engine assembly, said system comprising:
    an array of perforated tubes in flow communication with a flow of intake air, wherein each perforated tube comprises a solids inlet and a solids outlet, and wherein the array of perforated tubes are arranged such that at least some intake air of the gas turbine engine assembly only circulates around an exterior of each one of the array of perforated tubes without passing through said perforated tubes, such that at least some of the intake air passes to the gas turbine engine assembly without passing through said perforated tubes when traveling through the filtration system; and
    a solids feed system comprising a feed line coupled in flow communication with said solids inlet and configured to channel sorbent material through each perforated tube in said array, wherein the sorbent material is configured to remove gaseous contaminants entrained in the flow of intake air.

2. The system in accordance with claim 1, wherein said solids feed system further comprises:
    a recycle line coupled in flow communication with said solids outlet and configured to receive spent sorbent material from said array of perforated tubes; and
    a heater coupled in flow communication with said recycle line, wherein said heater is configured to regenerate the spent sorbent material.

3. The system in accordance with claim 2, wherein said heater comprises an outlet configured to channel a flow of contaminant-rich off-gas away from the flow of intake air as the spent sorbent material is regenerated.

4. The system in accordance with claim 2, wherein said solids feed system is configured to channel sorbent material through said array of perforated tubes at a flow rate based at least partially on a regeneration rate of the spent sorbent material.

5. The system in accordance with claim 1, wherein said solids feed system is configured to channel sorbent material through said array of perforated tubes at a flow rate based at least partially on an adsorption capacity of the sorbent material.

6. The system in accordance with claim 1, wherein said solids feed system is configured to channel a substantially continuous flow of sorbent material through said array of perforated tubes.

7. The system in accordance with claim 1, wherein said solids feed system is configured to channel sorbent material selected as a function of characteristics of the intake air.

8. The system in accordance with claim 1, wherein the sorbent material includes at least one of a carbon-based material, a calcium-based material, and a desiccant material.

9. The system in accordance with claim 1, further comprising a monitoring arrangement for monitoring a parameter of the intake air upstream and downstream from the array of perforated tubes.

10. The system in accordance with claim 9, wherein the monitoring arrangement includes a first monitor and a second monitor and a controller, the first and second monitors operatively connected to the controller.

11. The system in accordance with claim 10, wherein the first monitor is upstream of the array of perforated tubes relative to the flow of intake air, and wherein the second monitor is downstream of the array of perforated tubes relative to the flow of intake air.

12. The system in accordance with claim 11, wherein at least one of the first and second monitors comprise a Quartz Crystal Microbalance.

13. A gas turbine engine assembly comprising:
    a filter house having a filtration system, the filtration system comprising:
    an array of perforated tubes in flow communication with a flow of intake air, wherein each perforated tube comprises a solids inlet and a solids outlet, and wherein the array of perforated tubes are arranged such that at least some intake air of the gas turbine engine assembly only circulates around an exterior of each one of the array of perforated tubes without passing through said perforated tubes, such that at least some of the intake air passes to the gas turbine engine assembly without passing through said perforated tubes when traveling through the filtration system;
    a solids feed system comprising a feed line coupled in flow communication with said solids inlet and configured to channel sorbent material through each perforated tube in said array, wherein the sorbent material is configured to remove gaseous contaminants entrained in the flow of intake air in a duct coupled to an outlet of said filter house, wherein said duct is configured to channel the flow of intake air downstream therefrom; and
    a monitoring arrangement for monitoring a parameter of the intake air upstream and downstream from the array of perforated tubes, the monitoring arrangement operable to vary at least one of a recirculation, regeneration, and replacement frequency of said sorbent material based upon said monitored parameter.

14. The assembly in accordance with claim 13, wherein said filter house further comprises a filter assembly configured to remove solid contaminants entrained in the flow of intake air.

15. The assembly in accordance with claim 14, wherein said filter assembly is one of upstream or downstream from said array of perforated tubes.

16. The assembly in accordance with claim 14, wherein said filter assembly comprises at least one high-efficiency filter element measured in accordance with at least one of EN1822 and EN779.

17. The assembly in accordance with claim 13, wherein said solids feed system further comprises:
a recycle line coupled in flow communication with said solids outlet and configured to receive spent sorbent material from said array of perforated tubes; and
a heater coupled in flow communication with said recycle line, wherein said heater is configured to regenerate the spent sorbent material.

18. The assembly in accordance with claim 17, wherein said heater is positioned away from said filter house such that a flow of contaminant-rich off-gas is channeled away from the flow of intake air as the spent sorbent material is regenerated.

19. The assembly in accordance with claim 17, wherein said solids feed system is configured to channel sorbent material through said array of perforated tubes at a flow rate based at least partially on a regeneration rate of the spent sorbent material.

20. The assembly in accordance with claim 13, wherein said solids feed system is configured to channel sorbent material through said array of perforated tubes at a flow rate based at least partially on an adsorption capacity of the sorbent material.

21. A method of assembling a filtration system for use in a gas turbine assembly, said method comprising:
providing an array of perforated tubes that each include a solids inlet and a solids outlet, wherein the array of perforated tubes is configured to be in flow communication with a flow of intake air and wherein the array of perforated tubes are arranged such that at least some intake air of the gas turbine engine assembly only circulates around an exterior of each one of the array of perforated tubes without passing through said perforated tubes, such that at least some of the intake air passes to the gas turbine engine assembly without passing through said perforated tubes when traveling through the filtration system; and
coupling a feed line of a solids feed system in flow communication with the solids inlet, wherein the solids feed system is configured to channel sorbent material through each perforated tube in the array, the sorbent material configured to remove gaseous contaminants entrained in the flow of intake air.

22. The method in accordance with claim 21 further comprising positioning a filter assembly downstream from the array of perforated tubes, wherein the filter assembly is configured to remove solid contaminants entrained in the flow of intake air.

23. The method in accordance with claim 21 further comprising:
coupling a recycle line coupled in flow communication with the solids outlet, wherein the recycle line is configured to receive spent sorbent material from the array of perforated tubes; and
coupling a heater in flow communication with the recycle line, wherein the heater is configured to regenerate the spent sorbent material.

24. The method in accordance with claim 23 further comprising orienting an outlet defined in the heater such that a flow of contaminant-rich off-gas channeled therethrough is discharged away from the flow of intake air as the spent sorbent material is regenerated.

25. The method in accordance with claim 21, further comprising positioning a monitoring arrangement in proximity to the array of perforated tubes.

* * * * *